US012545526B2

(12) United States Patent
Wöhle et al.

(10) Patent No.: US 12,545,526 B2
(45) Date of Patent: Feb. 10, 2026

(54) METHOD AND APPARATUS FOR GROUPING AND/OR SEPARATING PRODUCTS TRANSPORTED IN ROWS

(71) Applicant: Illinois Tool Works Inc., Glenview, IL (US)

(72) Inventors: Linus Wöhle, Schapen (DE); Tobias Van Dülmen, Lünne (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 202 days.

(21) Appl. No.: 18/283,120

(22) PCT Filed: Mar. 22, 2022

(86) PCT No.: PCT/US2022/021346
§ 371 (c)(1),
(2) Date: Sep. 20, 2023

(87) PCT Pub. No.: WO2022/204146
PCT Pub. Date: Sep. 29, 2022

(65) Prior Publication Data
US 2024/0166452 A1 May 23, 2024

(30) Foreign Application Priority Data

Mar. 22, 2021 (EP) .................................... 21164090

(51) Int. Cl.
*B65G 47/29* (2006.01)
*B65G 47/08* (2006.01)
(Continued)

(52) U.S. Cl.
CPC ........... *B65G 47/082* (2013.01); *B65G 47/29* (2013.01); *B65G 47/30* (2013.01); *B65G 47/88* (2013.01)

(58) Field of Classification Search
CPC ...... B65G 47/082; B65G 47/29; B65G 47/30; B65G 47/88; B65G 47/8823
(Continued)

(56) References Cited

U.S. PATENT DOCUMENTS 5,147,027 A    9/1992   Cruver
5,551,550 A *   9/1996   Marshall ................ B65G 47/82
                                                              198/419.3
(Continued)

OTHER PUBLICATIONS

European Patent Office (EPO), Rijswijk, NL, International Search Report, Form PCT/ISA/210 for International Application No. PCT/US2022/021346, Jul. 4, 2022 (4 pp.).
(Continued)

*Primary Examiner* — Douglas A Hess
(74) *Attorney, Agent, or Firm* — Pauley Erickson & Swanson (57) ABSTRACT

A method for grouping and/or separating products transported in rows. With the aid of a first conveyor belt, the products to be grouped or separated are conveyed onto a second conveyor belt connected in series with the first conveyor belt until a downstream product of the products to be grouped or separated runs up against a dividing web of a dividing device associated with the second conveyor belt. After or as the downstream product runs up against the dividing web, a conveyance of products into the upstream region of the second conveyor belt effected by means of the first conveyor belt is interrupted. The second conveyor belt is driven continuously in a transport direction specified by the second conveyor belt, and the dividing web runs along with the second conveyor belt in its transport direction over a defined distance and is then removed from the product flow of the second conveyor belt.

14 Claims, 2 Drawing Sheets

(51) Int. Cl.
*B65G 47/30* (2006.01)
*B65G 47/88* (2006.01)

(58) Field of Classification Search
USPC .......................................... 198/419.1, 419.3
See application file for complete search history.

(56) References Cited

U.S. PATENT DOCUMENTS

| | | | |
|---|---|---|---|
| 6,360,871 B1 | 3/2002 | Meyer et al. | |
| 6,763,929 B2 | 7/2004 | Malini | |
| 7,353,933 B1 * | 4/2008 | Parnell | B65G 47/082 |
| | | | 198/460.1 |
| 7,726,463 B2 * | 6/2010 | Aronsson | B65G 47/841 |
| | | | 198/419.3 |
| 7,726,464 B2 * | 6/2010 | Cerf | B65G 47/088 |
| | | | 198/429 |
| 8,162,130 B2 * | 4/2012 | Rabec | B65G 47/082 |
| | | | 198/419.3 |
| 8,448,777 B2 * | 5/2013 | Pazdernik | B65G 47/088 |
| | | | 198/418.6 |
| 9,315,338 B2 | 4/2016 | Peterman et al. | |
| 9,637,256 B2 * | 5/2017 | Van Wickeren | B65B 27/04 |
| 9,850,012 B2 * | 12/2017 | Blanz | B65H 33/16 |
| 9,873,571 B2 * | 1/2018 | Hahn | B65G 47/082 |
| 10,099,865 B2 * | 10/2018 | Hammacher | B65G 47/082 |
| 10,138,074 B2 * | 11/2018 | Anders | B65B 35/04 |
| 10,661,999 B2 * | 5/2020 | Faust | B65G 47/266 |

OTHER PUBLICATIONS

European Patent Office (EPO), Munich, DE, Written Opinion of the Int'l Searching Authority for Int'l Appln No. PCT/US2022/021346, Form PCT/ISA/237, Jul. 4, 2022 (6 pp.).

* cited by examiner

METHOD AND APPARATUS FOR GROUPING AND/OR SEPARATING PRODUCTS TRANSPORTED IN ROWS

CROSS REFERENCE TO RELATED APPLICATION

This application is a National Phase filing of PCT International Patent Application PCT/US2022/021346, filed on 22 Mar. 2022, which claims the priority of European Patent Application Number EP 21164090.9, filed 22 Mar. 2021.

These applications are hereby incorporated by reference herein in their entirety and is made a part hereof, including but not limited to those portions which specifically appear hereinafter.

BACKGROUND OF THE INVENTION

Field of the Invention

The present invention relates to a method as well as an apparatus for grouping and/or separating products transported in rows. The products considered herein are, for example, piece goods, articles, or packs.

Discussion of Related Art

A continuous product feed is often required, particularly in production plants for bulk goods production. Often, when transported between the processing machines, the individual products are in a more or less closed product flow.

However, after a certain point in time, or depending on the existing capacity and the given construction of the processing machine, it can be necessary to divide the products conveyed in series into different subgroups, in particular also with regard to subsequent layer formation and/or palleting or film-wrapping of the products.

Methods and apparatuses for dividing products conveyed one after the other in series in succession are generally known in principle from the prior art. In this context, for example, reference is made to the publication DE 10 2012 111 920 A1.

With such a device, products such as juice-filled beverage cartons, having been conveyed one after the other in series from the filling system, for example, are moved transverse to their conveying direction in order to then group them and package the grouped products into packs in a packaging machine. They can be placed in packaging cartons in a group with, for example, four or six products, or they can be film-shrunk into a pack.

SUMMARY OF THE INVENTION

The products conveyed one after the other in a single row may need to be separated, but in any case must be moved in a controlled manner transverse to the conveying direction in order to distribute them in a plurality of downstream rows conveyed in parallel. The number of products in a pack is, of course, arbitrary.

For example, in the device known from publication DE 10 2012 111 920 A1 for the regrouping or resorting of a number of products conveyed one after the other in at least one row into an assembly with products located adjacent to one another transverse to the conveying direction, a stepped spool is provided, being movable transverse to the conveying direction, which, in a pushing operation transverse to the conveying direction, sequentially shifts the successive products that are to be regrouped or resorted sequentially by a different displacement path transverse to the conveying direction. The spool has a staircase-like or stepped contour with abutment surfaces, which shift successive products in the conveying direction transverse to the conveying direction by an amount corresponding to at least the product width or the product diameter. After formation of the step shape, the products are subsequently decelerated or accelerated, and the deceleration or acceleration then results in a plurality of groups of at least two products of an assembly next to one another and transverse to the conveying direction.

In the continuous horizontal conveyance of products by means of belt conveyors or the like, the products are conveyed in an uninterrupted series or in a plurality of parallel uninterrupted series to successive processing and/or handling stations. If the products are to be processed in groups from a certain point in time, for example in order to assemble a pack group, a separation of the desired number of products from the uninterrupted and usually largely gapless product flow is required.

Known grouping elements provide, for example, so-called dividing fingers that can dip into the flow from below, above, or from a lateral direction, and provide for the production of a defined gap between the grouped products by retaining or accelerating a defined number of products compared to a faster moving conveyor belt or, if necessary, by accelerating compared to a slower moving conveyor belt.

Such grouping methods are used, for example, in the conveyance of beverage containers.

For example, publication GB 2 316 926 B discloses a feeder apparatus for a packaging machine, wherein a feed-in apparatus accelerates one or more products from a defined stock. The stock moves over a transfer plate, and the one or more products are raised from below with a driven belt, wherein the products move at the same speed as the driven belt. In operation, the products slide along the transfer plate and do not contact the running belt. As soon as the first group of products are located over a guide element, cams move in order to raise the guide element. The raised products are then accelerated out of the subsequent product flow.

The problem of the present invention is to specify a method as well as an apparatus for grouping and/or separating products conveyed in series, wherein, in an easily realized but nevertheless effective manner, a distance between subgroups divided from the product flow is variable and continuously adjustable.

In particular, a principle for product separation with continuously adjustable repeat length is to be specified.

The product groups created with the aid of the method according to the invention or with the aid of the apparatus according to the invention are preferably subsequently fed to a flow bag machine with a continuously adjustable gap between them. In doing so, this process must run continuously after the product separation.

With regard to the method, the problem underlying the invention is solved by the subject matter of independent claim 1, wherein advantageous further developments of the method according to the invention are specified in the dependent claims 2 to 8.

With regard to the apparatus, the problem underlying the invention is solved by the subject matter of parallel claim 9, wherein advantageous further developments of the apparatus according to the invention are specified in the dependent claims 10 to 13.

Accordingly, the invention relates in particular to a method for grouping and/or separating products transported in rows, wherein the method comprises the following method steps:

With the aid of a first conveyor belt, the products to be grouped or separated are conveyed onto a second conveyor belt connected in series with the first conveyor belt until a downstream product of the products to be grouped or separated runs up against a dividing web of a dividing device associated with the second conveyor belt. After or as the downstream product runs up against the dividing web, a conveyance of products into the upstream region of the second conveyor belt effected by means of the first conveyor belt is interrupted.

According to the present invention, in this context in particular, it is provided that the second conveyor belt is continuously driven in a transport direction defined by the second conveyor belt. In this context in particular, it is provided that the dividing web preferably travels along with the second conveyor belt in its transport direction over a defined distance and is preferably then removed from the product flow of the second conveyor belt.

According to preferred realizations of the method according to the invention, it is provided that, after the dividing web is removed from the product flow of the second conveyor belt, said dividing web is moved back again counter to the transport direction of the second conveyor belt into an upstream region of the second conveyor belt, in which the products conveyed by the first conveyor belt can run up against the dividing web that has been moved back.

In particular, it can be provided in this context that, after the dividing web is moved back into the upstream region of the second conveyor belt, a conveyance of products into the upstream region of the second conveyor belt effected by means of the first conveyor belt is resumed, so that, with the aid of the first conveyor belt, the products to be grouped or separated are again conveyed onto the second conveyor belt, namely until a downstream product of the products to be grouped or separated runs up against the dividing web which has been moved back into the upstream region of the second conveyor belt.

According to the invention, the dividing device associated with the second conveyor belt is configured in particular in order to, after the dividing web has been removed from the product flow of the second conveyor belt, move said dividing web back into an upstream region of the second conveyor belt, in which the products conveyed by the first conveyor belt can run up, in accordance with a time and/or event sequence which is in particular defined or definable in advance, such that, with respect to the second conveyor belt, a repeat length is in particular variable and in particular continuously adjustable.

According to realizations of the invention, it is provided that, for transporting the dividing web, the dividing device associated with the second conveyor belt comprises at least one circulating endless belt, which is configured in order to guide and transport the dividing web in a closed curve, wherein, when the dividing web is moved back to the upstream region of the second conveyor belt, the dividing web is guided and/or transported above, below, or to the side of a conveying plane of the second conveyor belt.

In particular, it can be provided that a speed at which the dividing web travels along with the second conveyor belt in its transport direction over the defined distance is preferably adjustable and is in particular coordinated with the transport speed of the second conveyor belt such that the speed of the dividing web as it travels along with the second conveyor belt in its transport direction corresponds at least substantially to the transport speed of the second transport belt.

Alternatively of additionally, it can be provided that a speed at which the dividing web travels along with the second conveyor belt in its transport direction over the defined distance is preferably adjustable and is in particular coordinated with the transport speed of the second transport belt such that the speed of the dividing web as and/or immediately before it is removed from the product flow of the second conveyor belt is greater than the transport speed of the second conveyor belt.

According to realizations of the present invention, it is provided that the dividing device associated with the second conveyor belt comprises at least two dividing webs which are guided and/or transported by the circulating endless belt.

With regard to the apparatus for grouping and/or separating products conveyed in series, it is provided according to the invention that the apparatus comprises a horizontal conveying device with an upstream first conveyor belt and a downstream second conveyor belt connected in series with the first conveyor belt. Moreover, the apparatus comprises a dividing device associated with the second conveyor belt, said dividing device having at least one dividing web.

According to the invention, the apparatus comprises in particular a control device, which is configured in order to operate the first conveyor belt in particular in a start-stop mode.

The dividing device associated with the second conveyor belt is configured in particular in order to preferably guide the at least one dividing web in a closed curve such that the at least one dividing web travels along with the second conveyor belt in its transport direction over a defined distance and is then removed from the product flow of the second conveyor belt and moved back again counter to the transport direction of the second conveyor belt into an upstream region of the second conveyor belt.

The first conveyor belt is configured in order to convey the products to be grouped or separated into the upstream region of the second conveyor belt. The control device is configured in order to interrupt a conveyance of products into the upstream region of the second conveyor belt effected by means of the first conveyor belt when a downstream product of the products to be grouped or separated runs up against the at least one dividing web in the upstream region of the second conveyor belt.

According to preferred embodiments of the apparatus according to the invention, it is provided that, in order to interrupt a conveyance of products into the upstream region of the second conveyor belt effected by means of the first conveyor belt, the control device is configured in order to stop a drive device associated with the first conveyor belt.

Alternatively or additionally, it is also conceivable that, in order to interrupt a conveyance of products into the upstream region of the second conveyor belt effected by means of the first conveyor belt, a retention device which can be controlled as needed, in particular with a pressure element, preferably in the form of a pressure plate, is preferably provided at the upstream end region of the first conveyor belt.

According to realizations of the apparatus according to the invention, the second conveyor belt is associated with a drive device, which is configured in order to drive the second conveyor belt continuously and with a preferably adjustable but in particular constant transport speed in the transport direction of the second conveyor belt, wherein the first conveyor belt is associated with a drive device, which is configured in order to drive the first conveyor belt, in particular as needed, with a preferably adjustable transport speed, which is in particular higher than the transport speed of the second conveyor belt, in the transport direction of the first conveyor belt.

As in the method according to the invention, it is also conceivable in principle in the apparatus according to the invention that a number of dividing webs guided in a closed curve is selected or adjustable as a function of a number of products to be grouped or separated, wherein the more dividing webs are guided in the closed curve, preferably in an equidistant manner, the lower the number of products to be grouped or separated.

Alternatively or additionally, it is conceivable that the closed curve in which the at least one dividing web is guided is selected or adjustable such that, with respect to the second conveyor belt, a repeat length is in particular variable and in particular continuously adjustable. The repeat length is in particular increased when the closed curve is selected or adjusted such that a frequency at which a dividing web is moved back into the downstream region of the second conveyor belt is reduced.

To guide the at least one dividing web in a closed curve, the dividing device can comprise a circulating carrier belt or a circulating carrier chain, wherein the circulating carrier belt or the circulating carrier chain is configured in order to guide the at least one dividing web in a preferably adjustable curve, wherein, when the at least one dividing web is moved back to the upstream region of the second conveyor belt, the at least one dividing web is guided and/or transported above, below, or to the side of a conveying plane of the second conveyor belt.

The invention further relates to a system for separating products for multi-row packs, wherein the system comprises a first apparatus of the aforementioned type according to the invention as well as at least one further, second apparatus of the aforementioned type according to the invention. The system further comprises a device for consolidating the products or product groups separated by means of the first apparatus and the at least one second apparatus.

Preferably, the device for consolidating comprises two lateral transport belts, which are disposed opposite to one another and are configured and/or disposed such that, seen in transport direction, the products or product groups separated by the first apparatus and the at least one second apparatus are consolidated in a conical, tapering manner.

In this context, it is conceivable that the first and at least one second apparatus are operated in phase such that, with the aid of the device for consolidating the products or product groups separated by means of the first and at least one second apparatus, the separated products or product groups are consolidated as multi-row, in particular two-row, packs.

Alternatively, however, it is also conceivable that the first and at least one second apparatus are operated in phase opposition such that, with the aid of the device for consolidating the products or product groups separated by means of the first and second apparatus, the separated products or product groups are consolidated as single-row packs.

BRIEF DESCRIPTION OF SEVERAL VIEWS OF THE DRAWINGS

Exemplary embodiments of the invention are described in further detail below with reference to the accompanying drawings.

The following are shown.

DETAILED DESCRIPTION OF THE INVENTION

Figure 1:
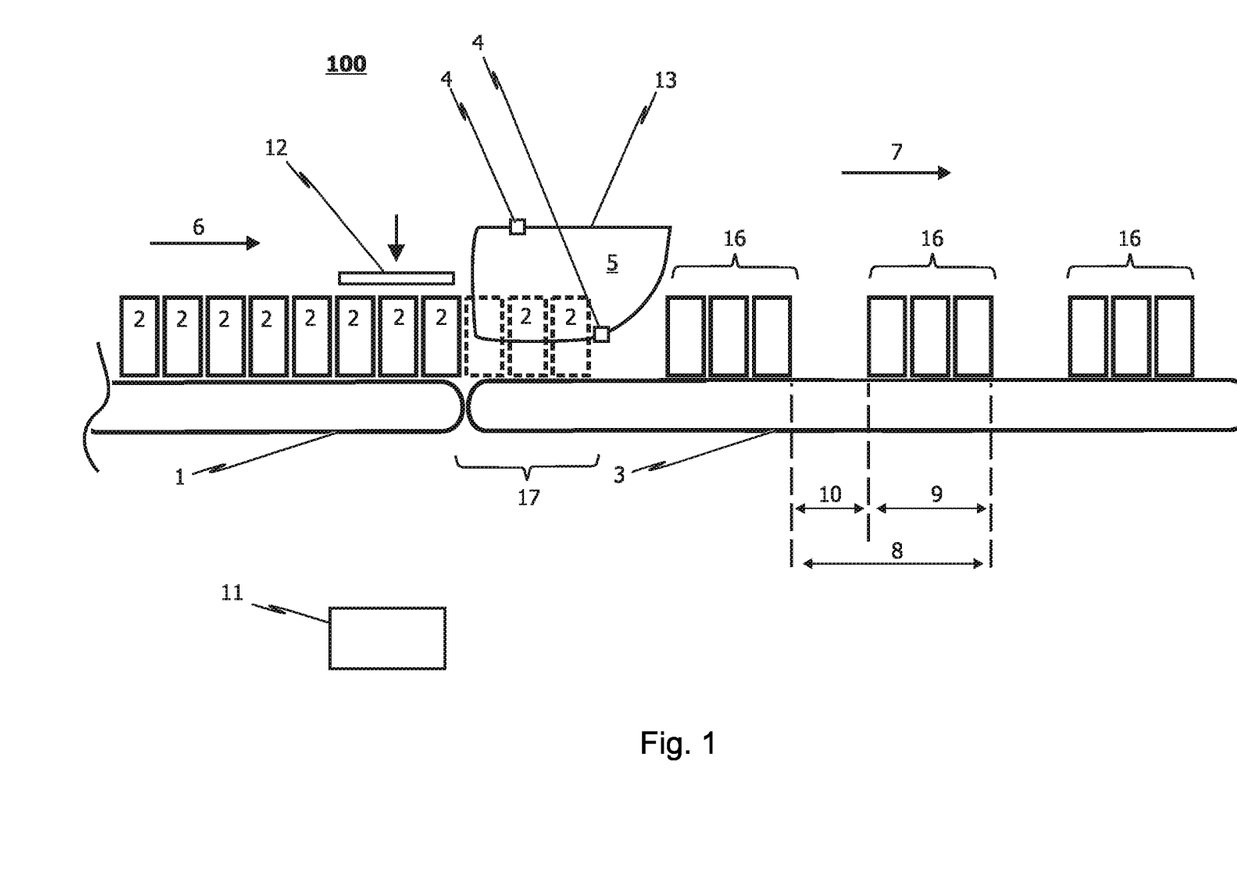
FIG. 1 schematically and in a lateral view, an exemplary embodiment of the apparatus according to the invention for grouping and/or separating products conveyed in series.

The apparatus 100 schematically shown in FIG. 1 for grouping and/or separating products 2 conveyed in series comprises a horizontal conveying device, which includes an upstream first conveyor belt 1 and a downstream second conveyor belt 3 connected in series with the first conveyor 1. On the upstream first conveyor belt 1, the products 2 to be grouped or separated are conveyed one after the other, i.e. in a row.

In order to group the products 2, it is necessary to form product groups 16 that are separated from one another. The task here is, in particular, to be able to continuously adjust a repeat length 8 of the grouped products or product groups 16 or a length 10 of a distance between two adjacent product groups 16.

As indicated in FIG. 1, the repeat length 8 is understood to mean the product length 9, i.e. the length of the product group 16, plus the gap length 10, i.e. the length of a distance between two adjacent product groups 16.

In addition, the process is designed in order to run continuously after product separation.

For this purpose, it is provided in the apparatus 100 according to the invention that the second conveyor belt 3 is driven continuously in a transport direction 7 defined by the second conveyor belt 3.

Further, in the transition region 17 between the first conveyor belt 1 and the second conveyor belt 3, there is provided a dividing device 5, which comprises at least one dividing web 4 (in FIG. 1, the dividing device 5 comprises two dividing webs 4).

Unlike the second conveyor belt 3, the first conveyor belt 1 operates in a start-stop mode.

Specifically, it is provided in the apparatus 100 according to the invention that, with the aid of the first conveyor belt 1, the products 2 to be grouped or separated are conveyed onto a second conveyor belt 3 connected in series with the first conveyor belt 1 until a downstream product of the products 2 to be grouped or separated runs up against the dividing web 4 of a dividing device 5 associated with the second conveyor belt 3. After or as the downstream product runs up against the dividing web 4, a conveyance of products 2 into the upstream region of the second conveyor belt 3 effected by means of the first conveyor belt 1 is interrupted.

As already indicated, the second conveyor belt 3 is continuously driven in the transport direction 7 defined by the second conveyor belt 3, wherein the transport direction 7 provided by the second conveyor belt 3 can also correspond to the transport direction 6 defined by the first conveyor 1. Here, it is provided that the dividing web 4 of the dividing device 5 preferably travels along with the second conveyor belt 3 in its transport direction 7 over a defined distance and is then removed from the product flow of the second conveyor belt 3.

After the dividing web 4 is removed from the product flow of the second conveyor belt 3, said dividing web is moved back again counter to the transport direction 7 of the second conveyor belt 3 into an upstream region of the second conveyor belt 3, in which the products 2 conveyed by the first conveyor belt 1 can run up against the dividing web 4 that has been moved back.

After moving the dividing web 4 back into the upstream region of the second conveyor belt 3, a conveyance of products 2 to the upstream region of the second conveyor belt 3 effected by means of the first conveyor belt 1 is resumed, so that the products 2 to be grouped or separated are conveyed back onto the second conveyor 3 with the aid of the first conveyor belt 1.

This occurs in particular until a downstream product of the products 2 to be grouped or separated runs up against the dividing web 4 which has been moved back into the upstream region of the second conveyor belt 3.

After or as the downstream product runs up against the dividing web 4, a conveyance of products 2 into the upstream region of the second conveyor belt 3 effected by means of the first conveyor belt 1 is again interrupted.

In particular, in the exemplary embodiment of the apparatus 100 according to the invention as shown in the drawings, it is provided that the dividing device 5 is configured in order to guide the dividing web 4 in a closed curve such that the at least one dividing web 4 travels along with the second conveyor belt 3 in its transport direction 7 over a defined distance and is then removed from the product flow of the second conveyor belt 3 and moved back again counter to the transport direction 7 of the second conveyor belt 3 into the upstream region of the second conveyor belt 3.

The dividing device 5 has an associated control device 11, which is configured in order to interrupt a conveyance of products 2 into the upstream region of the second conveyor belt 3 effected by means of the first conveyor belt 1 when a downstream product of the products 2 to be grouped or separated runs up against the dividing web 4 in the upstream region of the second conveyor belt 3.

To interrupt a conveyance of products 2 into the upstream region of the second conveyor belt 3 effected by means of the first conveyor belt 1, the control device 11 can be configured in order to stop a drive device (not shown in FIG. 1) associated with the first conveyor belt 1.

Alternatively or additionally, in order to interrupt a conveyance of products 2 into the upstream region of the second conveyor belt 3 effected by means of the first conveyor belt 1, a retention device 12 which can be controlled as needed and is preferably arranged at the downstream end region of the first conveyor belt 1 can be provided.

As indicated schematically in FIG. 1, this retention device 12 can in particular comprise a pressure element in the form of a pressure plate, with which the products 2 conveyed on the first conveyor belt 1 are interrupted by a transfer to the second conveyor belt 3.

Preferably, the second conveyor belt 3 is also associated with a drive device (not shown in FIG. 1), which is configured in order to drive the second conveyor belt 3 continuously and at a preferably adjustable but in particular constant transport speed in the transport direction 7 of the second conveyor belt 3.

As already indicated, the first conveyor belt 1 is also associated with a drive device (not shown in FIG. 1), which is configured in order to drive the first conveyor belt 1 with a preferably adjustable transport speed in the transport direction 6 of the first conveyor belt 1, wherein, in particular, this transport speed is higher than the transport speed of the second conveyor belt 3.

As already stated, the dividing device 5 comprises at least one dividing web 4. Specifically, in the embodiment of the apparatus 100 according to the invention shown schematically in FIG. 1, a total of two dividing webs 4 are provided, which are guided in a closed curve.

Generally speaking, a number of dividing webs 4 guided in a closed curve is selected or adjustable depending on a number of products 2 to be grouped or separated. In this case, the more dividing webs 4 are preferably guided in an equidistant manner in the closed curve, the lower the number of products 2 to be grouped or separated.

The closed curve in which the at least one dividing web 4 is guided is selected or adjustable such that a repeat length 8 is in particular variable and in particular continuously adjustable with respect to the second conveyor belt 3. The repeat length 8 is in particular increased when the closed curve is selected or adjusted such that a frequency at which a dividing web 4 is moved back into the downstream region of the second conveyor belt 3 is reduced.

To guide the at least one dividing web 4 in a closed curve, the dividing device 5 comprises a circulating carrier belt 13 or a circulating carrier chain, wherein the circulating carrier belt 13 or the circulating carrier chain is configured in order to guide the at least one dividing web 4 in a preferably adjustable curve.

When the at least one dividing web 4 is moved back to the downstream region of the second conveyor belt 3, the at least one dividing web 4 is guided and/or transported above (as indicated in FIG. 1) a conveying plane of the second conveyor belt 3.

However, alternatively, it is also conceivable that, in order move the at least one dividing web 4 back to the upstream region of the second conveyor belt 3, the at least one dividing web 4 is guided and/or transported below or to the side of a conveying plane of the second conveyor belt 3.

As indicated in FIG. 1, the dividing web 4 preferably runs along with the second conveyor belt 3 in its transport direction 7 over a defined distance before it is removed from the product flow of the second conveyor belt 3. Preferably, a speed at which the dividing web 4 travels along with the second conveyor belt 3 in its transport direction 7 over the defined distance is adjustable and is in particular coordinated with the transport speed of the second conveyor belt 3 such that the speed of the dividing web 4 as it travels along with the second conveyor belt 3 in its transport direction 7 corresponds at least substantially to the transport speed of the second transport belt 3.

According to embodiments of the present invention, it is provided in particular in this context that a speed at which the dividing web 4 travels along with the second conveyor belt 3 in its transport direction 7 over the defined distance is preferably adjustable and is in particular coordinated with the transport speed of the second transport belt 3 such that the speed of the dividing web 4 as and/or immediately before it is removed from the product flow of the second conveyor belt 3 is greater than the transport speed of the second conveyor belt 3.

In other words, before the dividing web 4 is removed from the product flow of the second conveyor belt 3, the latter hurries somewhat ahead of the product group 16 in the transport direction 7 of the second conveyor belt 3 and is in particular no longer attached to the downstream product of the product group 16, such that the removal of the dividing web 4 from the product flow of the second conveyor belt 3 can take place without the risk that, with the removal of the dividing web 4, the downstream product of the product group 16 is at least partially taken along with the dividing web 4.

Referring now to the drawings in FIG. 2 and in FIG. 3, corresponding systems 14 for separating products 2 for single or multi-row packs will be described.

Figure 2:
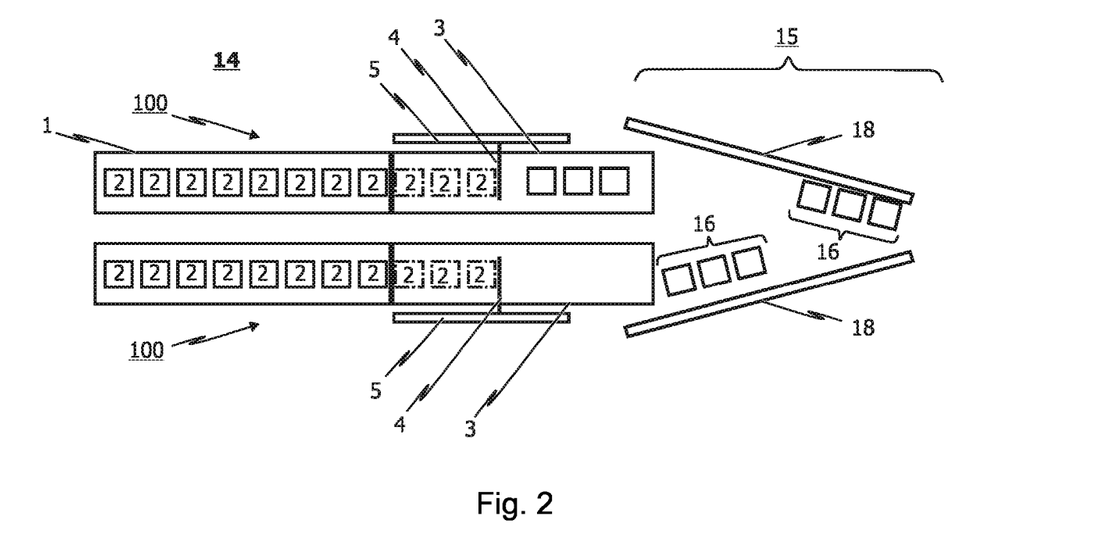
FIG. 2 schematically and in a top plan view, an exemplary embodiment of a system for separating products for single-row packs.

Specifically, FIG. 2 schematically and in a top plan view shows a system 14 for separating products 2 for single-row packs. Briefly summarized, this system 14 comprises two apparatuses 100 connected in parallel according to FIG. 1, wherein, in the downstream region of the respective second conveyor belts 3, a device 15 is arranged for consolidating the products separated by means of the two apparatuses 100 or product groups 16.

The device 15 for consolidating can comprise two lateral transport belts 18, which are disposed opposite to one another and are configured and/or disposed such that, seen in transport direction 7, the products or product groups 16 separated by the two apparatuses 100 are consolidated in a conical manner.

In the system 14 shown schematically in FIG. 2, the two apparatuses 100 for grouping and/or separating conveyed products 2 in series are operated in phase opposition such that, with the aid of the device 15 for consolidating the products or product groups 16 separated from the two apparatuses 100, the separated products or product groups 16 are consolidated as single-row packs.

Figure 3:
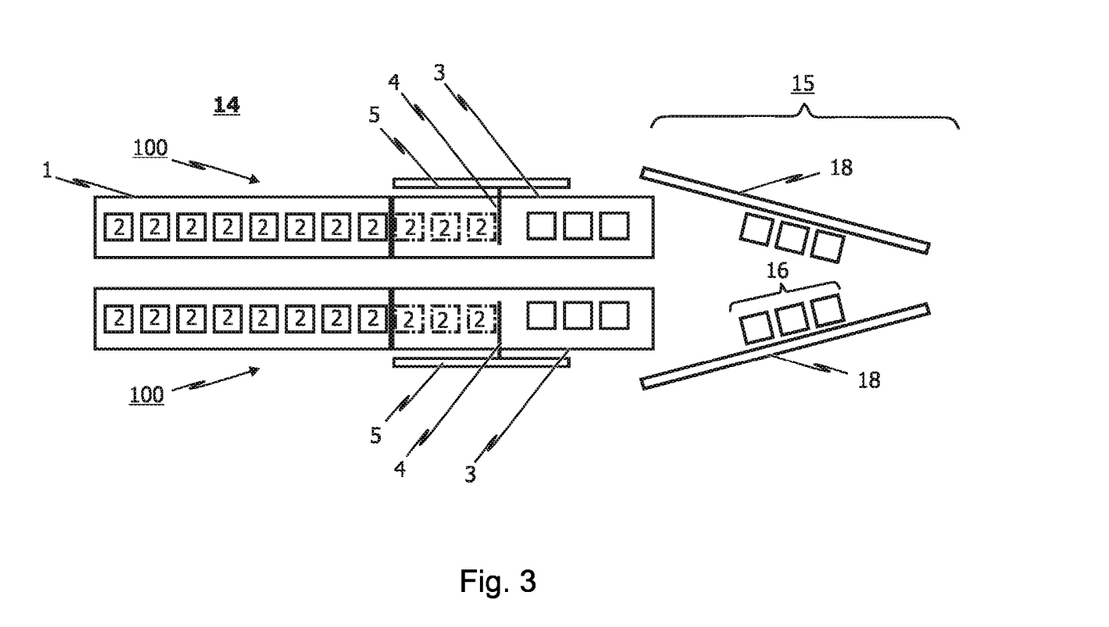
FIG. 3 schematically and in a top plan view, a system for separating products for multi-row packs.

By contrast, in the system 14 shown schematically in FIG. 3, it is provided that the two apparatuses 100 for grouping and/or separating products conveyed in series operate in phase such that, with the aid of the device 15 for consolidating the products or product groups 16 separated from the two apparatuses 100, the separated products or product groups 16 are combined as multiple rows, in particular.

Briefly summarized, the apparatus 100 according to the invention is a device for product separation with continuously adjustable repeat length. The pack groups 16 created can then be fed with a continuously adjustable gap between one another, for example, a film-coated flow bag machine. After product separation, the process runs continuously.

The underlying principle of the operation of the apparatus 100 according to the invention shown schematically in FIG. 1 provides that the first conveyor belt 1, which is in particular configured as a ground belt, is operated in start-stop mode and causes the products 2 to run up to a forerunning dividing web 4.

After the desired number of products, the first conveyor belt 1 stops. Supported by the retention device 12 with the pressure plate from above, the subsequent products 2 are retained.

The forerunning dividing web 4 extends upwards in its envelope curve out of the product flow of the second conveyor belt 3. In this case, the dividing web 4 may not contact the upstream product of the forerunning product group 16.

At the same time, the dividing web 4 must reach its starting position in the upstream region of the second conveyor 3 early enough and must also not hit the last (upstream) product of the product group 16.

The envelope curve with the at least one dividing web 4 must be selected such that the gap length 10 between the product groups 16 can be adjusted on the second conveyor belt 3 with an increased movement profile.

In this context, for example, it is conceivable that the number of dividing webs 4 that are moved on the envelope is varied.

The invention is not limited to the embodiments shown in the drawings, but results when all of the features disclosed herein are considered together.

The invention claimed is:

1. A method for grouping and/or separating products (2) transported in rows, wherein the method comprises:

conveying, with the aid of a first conveyor belt (1), the products (2) to be grouped or separated onto a second conveyor belt (3) connected in series with the first conveyor belt (1) until a downstream product of the products (2) to be grouped or separated runs up against a dividing web (4) of a dividing device (5) associated with the second conveyor belt (3); and interrupting, after or as the downstream product runs up against the dividing web (4), a conveyance of products (2) into the upstream region of the second conveyor belt (3) effected by means of the first conveyor belt (1), wherein the second conveyor belt (3) is driven continuously in a transport direction (7) specified by the second conveyor belt (3), and wherein the dividing web (4) travels along with the second conveyor belt (3) in its transport direction (7) over a defined distance and is then removed from the product flow of the second conveyor belt (3), configuring the control device (11) to stop a drive device associated with the first conveyor belt (1) to interrupt the conveyance of products (2) into the upstream region of the second conveyor belt (3) effected by means of the first conveyor belt (1); and/or controlling a retention device (12) with a pressure element, in the form of a pressure plate, provided at the downstream end region of the first conveyor belt to interrupt the conveyance of products (2) into the upstream region of the second conveyor belt (3) effected by means of the first conveyor belt (1).

2. The method according to claim 1, wherein, after the dividing web (4) is removed from the product flow of the second conveyor belt (3), the dividing web is moved back again counter to the transport direction (7) of the second conveyor belt (3) into an upstream region of the second conveyor belt (3), in which the products (2) conveyed by the first conveyor belt (1) run up against the dividing web (4) that has been moved back.

3. The method according to claim 2, wherein, after the dividing web (4) is moved back into the upstream region of the second conveyor belt (3), a conveyance of products (2) into the upstream region of the second conveyor belt (3) effected by means of the first conveyor belt (1) is resumed, so that, with the aid of the first conveyor belt (1), the products (2) to be grouped or separated are again conveyed onto the second conveyor belt (3), until a downstream product of the products (2) to be grouped or separated runs up against the dividing web (4) which has been moved back into the upstream region of the second conveyor belt (3).

4. The method according to claim 1, wherein the dividing device (5) associated with the second conveyor belt (3) is configured in order to, after the dividing web has been removed from the product flow of the second conveyor belt (3), move the dividing web (4) back into an upstream region of the second conveyor belt (3), in which the products (2) conveyed by the first conveyor belt (1) can run up in accordance with a time and/or event sequence, which is defined or definable in advance such that, with respect to the second conveyor belt (3), a repeat length (8) and/or a gap length (10) between two adjacent separated products or product groups (16) on the second conveyor belt (3) is variable and continuously adjustable.

5. The method according to claim 1,
wherein, for transporting the dividing web (4), the dividing device (5) associated with the second conveyor belt (3) comprises at least one circulating endless belt (13), which is configured in order to guide and/or transport the dividing web (4) in a closed curve, wherein, when the dividing web (4) is moved back to the upstream region of the second conveyor belt (3), the dividing web (4) is guided and/or transported above, below, or to the side of a conveying plane of the second conveyor belt (3).

6. The method according to claim 1,
wherein a speed at which the dividing web (4) travels along with the second conveyor belt (3) in its transport direction (7) over the defined distance is adjustable and is coordinated with the transport speed of the second conveyor belt (3) such that the speed of the dividing web (4) as it travels along with the second conveyor belt (3) in its transport direction (7) corresponds at least substantially to the transport speed of the second transport belt (3).

7. The method according to claim 1,
wherein a speed at which the dividing web (4) travels along with the second conveyor belt (3) in its transport direction (7) over the defined distance is adjustable and is coordinated with the transport speed of the second transport belt (3) such that the speed of the dividing web (4) as and/or immediately before it is removed from the product flow of the second conveyor belt (3) is greater than the transport speed of the second conveyor belt (3).

8. The method according to claim 1,
wherein the dividing device (5) associated with the second conveyor belt (3) comprises at least two dividing webs (4) which are guided and/or transported by the circulating endless belt (13).

9. An apparatus (100) for grouping and/or separating products (2) transported in rows, wherein the apparatus (100) comprises the following:
a horizontal conveying device comprising an upstream first conveyor belt (1) and a downstream second conveyor belt (3) connected in series with the first conveyor belt (1);
a dividing device (5) associated with the second conveyor belt (3) comprising at least one dividing web (4); and
a control device (11), which is configured to operate the first conveyor belt (1) in particular in a start-stop mode,
wherein the dividing device (5) is configured to guide the at least one dividing web (4) in a closed curve such that the at least one dividing web (4) travels along with the second conveyor belt (3) in its transport direction (7) over a defined distance and is then removed from the product flow of the second conveyor belt (3) and moved back again counter to the transport direction (7) of the second conveyor belt (3) into an upstream region of the second conveyor belt (3),
wherein the first conveyor belt (1) is configured to convey the products (2) to be grouped or separated into the upstream region of the second conveyor belt (3), and
wherein the control device (11) is configured to interrupt a conveyance of products (2) into the upstream region of the second conveyor belt (3) effected by means of the first conveyor belt (1) when a downstream product of the products (2) to be grouped or separated runs up against the at least one dividing web (4) in the upstream region of the second conveyor belt (3),
wherein, to interrupt a conveyance of products (2) into the upstream region of the second conveyor belt (3) effected by means of the first conveyor belt (1), the control device (11) is configured to stop a drive device associated with the first conveyor belt (1); and/or
wherein, to interrupt a conveyance of products (2) into the upstream region of the second conveyor belt (3) effected by means of the first conveyor belt (1), a retention device (12) which can be controlled as needed, with a pressure element, in the form of a pressure plate, is provided at the downstream end region of the first conveyor belt (1).

10. The apparatus (100) according to claim 9,
wherein the second conveyor belt (3) is associated with a drive device, which is configured to drive the second conveyor belt (3) continuously and with a adjustable transport speed in the transport direction (7) of the second conveyor belt (3), wherein the first conveyor belt (1) is associated with a drive device, which is configured to drive the first conveyor belt (1), as needed, with a adjustable transport speed, which is higher than the transport speed of the second conveyor belt (3), in the transport direction (7) of the first conveyor belt (1).

11. The apparatus (100) according to claim 9,
wherein a number of dividing webs (4) guided in a closed curve is selected or adjustable as a function of a number of products (2) to be grouped or separated, wherein the more dividing webs (4) are guided in the closed curve, in an equidistant manner, the lower the number of products (2) to be grouped or separated; and/or
wherein the closed curve in which the at least one dividing web (4) is guided is selected or adjustable such that, with respect to the second conveyor belt (3), a repeat length (8) is variable and continuously adjustable, wherein the repeat length (8) is increased when the closed curve is selected or set such that a frequency with which a dividing web (4) is moved back into the downstream region of the second conveyor belt (3), is reduced.

12. The apparatus (100) according to claim 9,
wherein, to guide the at least one dividing web (4) in a closed curve, the dividing device (5) comprises a circulating carrier belt (13) or a circulating carrier chain, wherein the circulating carrier belt (13) or the circulating carrier chain is configured to guide the at least one dividing web (4) in an adjustable curve, wherein, when the at least one dividing web (4) is moved back to the upstream region of the second conveyor belt (3), the at least one dividing web (4) is guided and/or transported above, below, or to the side of a conveying plane of the second conveyor belt (3).

13. A system (14) for separating products (2) for single or multi-row packs or product groups (16), wherein the system (14) comprises the following:
a first apparatus (100) according to claim 9;
at least one further, second apparatus (100) according to claim 9; and
a device (15) for consolidating the products or product groups (16) separated by means of the first apparatus (100) and the second apparatus (100),
wherein the device (15) for consolidating comprises two lateral transport belts (18), which are disposed opposite to one another and are configured and/or disposed such that, seen in transport direction (7), the products or product groups (16) separated by the first apparatus (100) and the second apparatus (100) are consolidated in a conical manner.

14. The system (14) according to claim 13,
wherein the first and second apparatus (100) are disposed and operated in phase such that, with the aid of the device (15) for consolidating the products or product groups (16) separated by the first and second apparatus (100), the separated products or product groups (16) are consolidated as multi-row, in particular two-row, packs; or
wherein the first and second apparatus (100) are disposed and operated in phase opposition such that, with the aid of the device (15) for consolidating the products or product groups (16) separated by the first and second apparatus (100), the separated products or product groups (16) are consolidated as single-row packs.

\* \* \* \* \*